(12) United States Patent
Chi et al.

(10) Patent No.: US 12,341,207 B2
(45) Date of Patent: Jun. 24, 2025

(54) BATTERY MODULE HAVING MODULE HOUSING OF THIN PLATE TYPE AND BATTERY PACK INCLUDING THE SAME

(71) Applicant: LG ENERGY SOLUTION, LTD., Seoul (KR)

(72) Inventors: Ho-June Chi, Daejeon (KR); Kyung-Mo Kim, Daejeon (KR); Jeong-O Mun, Daejeon (KR); Jin-Yong Park, Daejeon (KR); Hee-Jun Jin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 927 days.

(21) Appl. No.: 17/431,893

(22) PCT Filed: Mar. 19, 2020

(86) PCT No.: PCT/KR2020/003798
§ 371 (c)(1),
(2) Date: Aug. 18, 2021

(87) PCT Pub. No.: WO2020/190062
PCT Pub. Date: Sep. 24, 2020

(65) Prior Publication Data
US 2022/0140428 A1 May 5, 2022

(30) Foreign Application Priority Data
Mar. 21, 2019 (KR) .................. 10-2019-0032422

(51) Int. Cl.
*H01M 50/204* (2021.01)
*H01M 50/211* (2021.01)
(Continued)

(52) U.S. Cl.
CPC ....... *H01M 50/204* (2021.01); *H01M 50/211* (2021.01); *H01M 50/242* (2021.01);
(Continued)

(58) Field of Classification Search
CPC ............ H01M 50/204; H01M 50/262; H01M 50/289; H01M 50/242; H01M 50/211; H01M 50/271
(Continued)

(56) References Cited

U.S. PATENT DOCUMENTS 11,233,284 B2 * 1/2022 Geskes ............... H01M 50/204
2007/0133151 A1 6/2007 Joon et al.
(Continued)

FOREIGN PATENT DOCUMENTS

CN 1406395 A 3/2003
CN 202839780 U 3/2013
(Continued)

OTHER PUBLICATIONS

KR-2011097666-A (translation) (Year: 2011).*
(Continued)

*Primary Examiner* — Matthew T Martin
*Assistant Examiner* — Paul C St Wyrough
(74) *Attorney, Agent, or Firm* — Birch, Stewart, Kolasch & Birch, LLP

(57) ABSTRACT

Discussed is a battery module having a plurality of battery cells and a module housing forming an inner space for accommodating the plurality of battery cells, wherein the module housing includes a base plate forming a bottom surface of the module housing; a cover plate integrally forming a top surface and opposite side surfaces of the module housing; and a fastening flange configured to extend
(Continued)

in a horizontal direction in a region above the opposite side surfaces of the module housing.

21 Claims, 7 Drawing Sheets

(51) Int. Cl.
 *H01M 50/242* (2021.01)
 *H01M 50/262* (2021.01)
 *H01M 50/271* (2021.01)
 *H01M 50/289* (2021.01)

(52) U.S. Cl.
 CPC ....... *H01M 50/262* (2021.01); *H01M 50/271* (2021.01); *H01M 50/289* (2021.01)

(58) Field of Classification Search
 USPC .......................................................... 429/99
 See application file for complete search history.

(56) References Cited

U.S. PATENT DOCUMENTS

| | | | |
|---|---|---|---|
| 2008/0050645 | A1 | 2/2008 | Kai et al. |
| 2008/0057393 | A1 | 3/2008 | Onuki et al. |
| 2009/0239136 | A1 | 9/2009 | Nagamine et al. |
| 2014/0127552 | A1 | 5/2014 | Lu |
| 2017/0062781 | A1 | 3/2017 | Kim |
| 2018/0183114 | A1* | 6/2018 | Rittner .................. H01M 50/24 |
| 2019/0157639 | A1* | 5/2019 | Smith ................. H01M 10/525 |
| 2019/0267682 | A1 | 8/2019 | Seo et al. |
| 2020/0112071 | A1* | 4/2020 | Geskes ............. H01M 10/6554 |

FOREIGN PATENT DOCUMENTS

| | | | | |
|---|---|---|---|---|
| CN | 103787607 | A | | 5/2014 |
| CN | 205211891 | U | | 5/2016 |
| CN | 109817854 | A * | 5/2019 | .............. B60L 50/00 |
| DE | 102018120394 | A1 * | 2/2020 | ............... B60K 1/04 |
| JP | 7-251637 | A | | 10/1995 |
| JP | 2001-23702 | A | | 1/2001 |
| JP | 2003-86158 | A | | 3/2003 |
| JP | 2008-35671 | A | | 2/2008 |
| JP | 2012-101589 | A | | 5/2012 |
| JP | 2013-101902 | A | | 5/2013 |
| JP | 2013-125617 | A | | 6/2013 |
| JP | 2013-242967 | A | | 12/2013 |
| JP | 2014-203743 | A | | 10/2014 |
| JP | 2017-27938 | A | | 2/2017 |
| JP | 2018-43810 | A | | 3/2018 |
| KR | 10-1984-00009900 | A | | 3/1884 |
| KR | 10-0709261 | B1 | | 4/2007 |
| KR | 10-1051446 | B1 | | 7/2011 |
| KR | 10-2011-0097666 | A | | 8/2011 |
| KR | 2011097666 | A * | 8/2011 | .......... H01M 10/425 |
| KR | 2017065764 | A * | 6/2017 | .......... H01M 10/052 |
| KR | 10-1805652 | B1 | | 12/2017 |
| KR | 10-2016-0087083 | A | | 7/2018 |
| KR | 10-2018-0112617 | A | | 10/2018 |
| WO | WO2018/009002 | A1 | | 1/2018 |
| WO | WO2018/235557 | A1 | | 12/2018 |

OTHER PUBLICATIONS

KR-2017065764-A (translation) (Year: 2017).*
Extended European Search Report for European Application No. 20772797.5, dated Mar. 11, 2022.
International Search Report (PCT/ISA/210) issued in PCT/KR2020/003798, dated Jul. 21, 2020.

* cited by examiner

BATTERY MODULE HAVING MODULE HOUSING OF THIN PLATE TYPE AND BATTERY PACK INCLUDING THE SAME

TECHNICAL FIELD

The present disclosure relates to a battery module and a battery pack including the battery module, and more particularly, to a battery module for enhancing space utilization and securing mechanical rigidity and a battery pack including the battery module.

The present application claims priority to Korean Patent Application No. 10-2019-0032422 filed on Mar. 21, 2019 in the Republic of Korea, the disclosures of which are incorporated herein by reference.

BACKGROUND ART

A secondary battery refers to a battery that may be charged and discharged, unlike a primary battery that cannot be charged, and the secondary battery is used as a power source not only for small high-tech electronics such as a mobile phone, a PDA or a laptop computer but also for an energy storage system (ESS), an electric vehicle (EV) or a hybrid electric vehicle (HEV).

Currently widely used secondary batteries include lithium ion batteries, lithium polymer batteries, nickel cadmium batteries, nickel hydrogen batteries, nickel zinc batteries, and the like. An operating voltage of a unit secondary battery cell, namely a unit battery cell, is about 2.5V to 4.2V. Therefore, if higher output voltage and greater energy capacity are required, a plurality of battery cells are connected in series to configure a battery module, or two or more battery modules are connected in series or in parallel and other components are added to configure a battery pack. For example, the battery module may refer to a device in which a plurality of secondary batteries are connected in series or in parallel, and the battery pack may refer to a device in which battery modules are connected in series or in parallel to increase capacity and output.

As shown in FIG. 1, a battery module 1 includes a module housing 2 that accommodates and packages battery cells therein and protects the battery cells from external impact. The module housing 2 is made of a thick steel plate and serves to safely protect the battery cells from external impact.

The battery pack includes a pack tray 3 as a structure for giving a space in which the battery modules may be mounted. A battery pack for an electric vehicle employs a lot of cross beams 4 provided across the inner space of the pack tray 3 in order to prevent deformation such as warping caused by impact during operation.

Conventional battery modules are disposed between the cross beams, for example in a pattern as shown in FIG. 2, and long bolts B are inserted into four module/pack fastening portions in total at front and rear corners, respectively, and fastened to a top surface of the pack tray 3. In this way, the battery modules are fixed to the pack tray 3.

However, conventionally, when the battery pack is manufactured, a certain clearance is provided between the battery module 1 and the cross beam on the pack tray in order to secure assembly tolerance and strength reliability, but the clearance acts as a negative factor in terms of space utilization of the pack tray. In particular, if the battery pack is assembled using battery modules having a rigid module housing 2, the welding rate or energy share of the battery module is further reduced in the pack tray due to the space occupied by the thickness of the module housing.

Therefore, it is necessary to find a technique for safely protecting the battery cells from external impact while maximizing the space of the battery cells by reducing the size of the structure in the battery module or pack.

DISCLOSURE

Technical Problem

The present disclosure is designed to solve the problems of the related art, and therefore the present disclosure is directed to providing a battery module and a battery pack having a structure, which may maximize a space capable of accommodating battery cells and safely protect the battery cells from mechanical impact and vibration.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module having a plurality of battery cells and a module housing forming an inner space for accommodating the battery cells, wherein the module housing includes: a base plate forming a bottom surface of the module housing; a cover plate integrally forming a top surface and both side surfaces of the module housing; and a fastening flange configured to extend in a horizontal direction in a region above both side surfaces of the module housing.

The cover plate may be formed in a thin plate type with a thickness of 0.1 mm to 1 mm.

The cover plate may include a top part forming the top surface of the module housing, and a first side part and a second side part forming both side surfaces of the module housing, and an impact absorbing body may be further attached to an outer surface of at least one of the first side part and the second side part.

The impact absorbing body may be a leaf spring respectively attached to the outer surface of the first side part and the outer surface of the second side part, and the leaf spring may have a center portion curved convexly, and a top portion and a bottom portion of the leaf spring based on the center portion may be welded to the outer surface of the first side part and the outer surface of the second side part.

The leaf spring may be formed as a body integrated with the fastening flange, and the fastening flange may be provided to be bent in a direction crossing the leaf spring at the top portion of the leaf spring and has at least one hole.

In another aspect of the present disclosure, there is also provided a battery pack, comprising: at least one battery module described above; and a pack tray configured to provide a space in which the at least one battery module is mounted, wherein the pack tray includes a plurality of rigid beams configured to support both side portions of the battery module.

The battery module may be placed between two of the rigid beams, and the fastening flange may be coupled to a top surface of the rigid beam.

The battery pack may further comprise a pack cover coupled to the pack tray and configured to cover an upper portion of the battery module.

The pack cover, the fastening flange and the rigid beam may be integrally fastened to each other by a fastening member.

The battery pack may further comprise a spacer attached to a bottom surface of the pack cover and configured to surface-press the fastening flange.

The battery pack may further comprise a buffer pad attached to a bottom surface of the pack cover and adhered to a top surface of the module housing.

The battery pack may further comprise a heatsink disposed at a bottom surface of the at least one battery module.

Advantageous Effects

According to an embodiment of the present disclosure, it is possible to provide a battery module having a higher cell volume ratio and lighter weight than a conventional one by forming the module housing in a thin plate type.

According to another embodiment of the present disclosure, it is possible to provide a battery pack configured to endow mechanical rigidity to battery modules having the module housing of a thin plate type and allow the battery modules to be fixed efficiently in terms of space.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
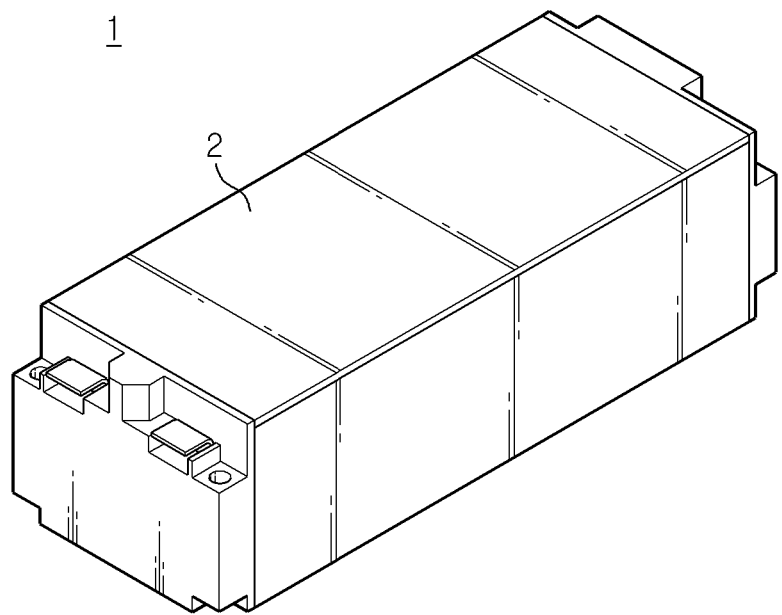
FIG. 1 is a perspective view schematically showing a module housing of a conventional battery module.
Figure 2:
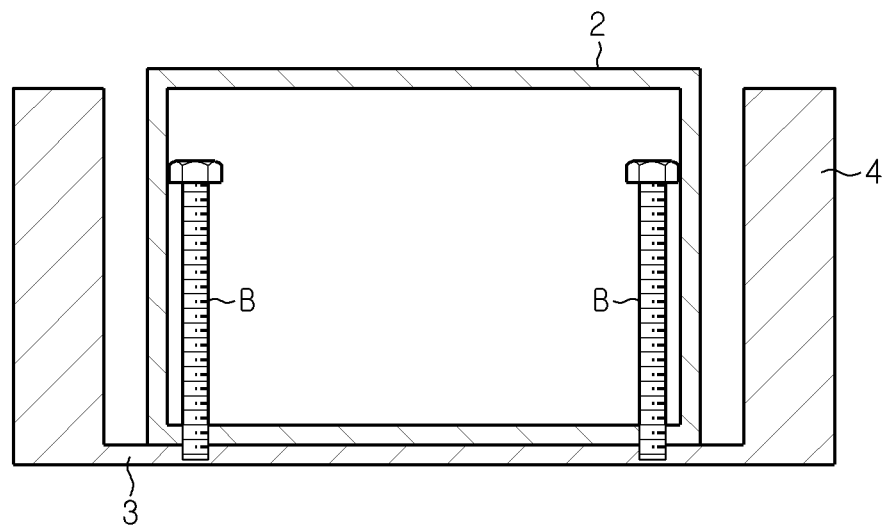
FIG. 2 is a view schematically showing the conventional battery module assembled with a pack tray.
Figure 3:
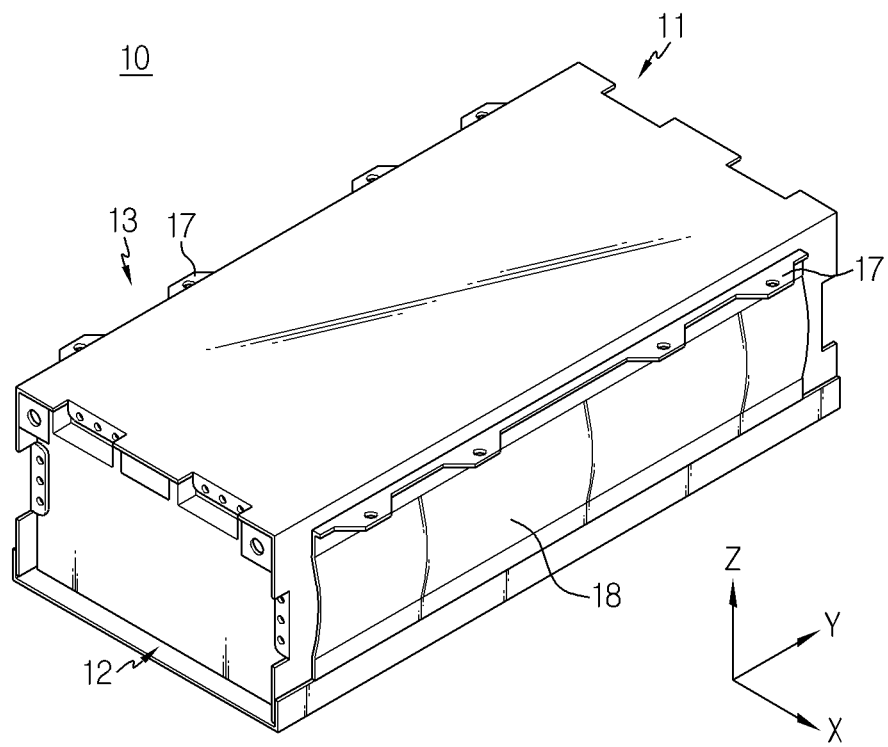
FIG. 3 is a perspective view schematically showing a module housing of a battery module according to an embodiment of the present disclosure.
Figure 4:
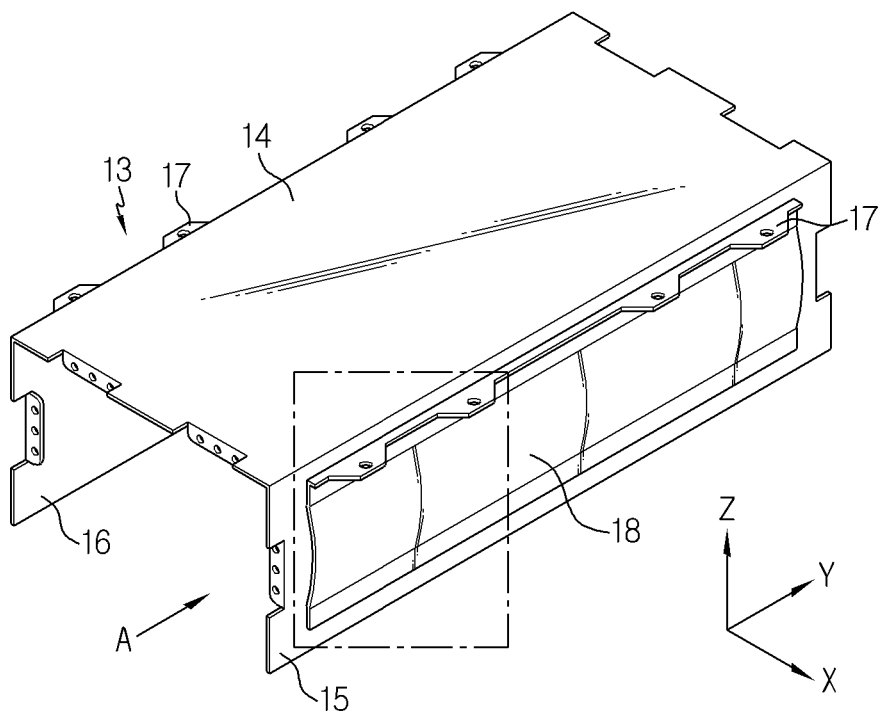
FIG. 4 is a perspective view showing a cover plate of the module housing of FIG. 3.

FIG. 3 is a perspective view schematically showing a module housing of a battery module according to an embodiment of the present disclosure, and FIG. 4 is a perspective view showing a cover plate of the module housing of FIG. 3.

A battery module 10 according to an embodiment of the present disclosure includes a plurality of battery cells (not shown) and a module housing 11 for accommodating the plurality of battery cells in an inner space thereof.

The plurality of battery cells are lithium ion secondary batteries capable of charging and discharging, and may be pouch-type secondary batteries having high energy density and ensuring easy stacking. Although not shown in the figures for convenience, the pouch-type secondary batteries may be stacked in one direction to overlap each other and accommodated in the module housing 11, and may be connected in series and/or in parallel depending on the demanded output voltage or the charge/discharge capacity through an ICB (Inter Connection Board).

The battery cells are not necessarily limited to pouch-type lithium ion secondary batteries. For example, the battery cells may be can-type lithium ion secondary batteries, nickel cadmium batteries, nickel hydrogen batteries, nickel zinc batteries, or the like.

Referring to FIGS. 3 and 4, the module housing 11 has a rectangular tubular shape made of a thin plate and includes a base plate 12 and a cover plate 13.

The base plate 12 is a part forming a bottom surface of the module housing 11, and generally has a plate shape with a flat surface. Also, an edge of the base plate 12 may be bent upward for bonding with the cover plate 13. As the material of the base plate 12, a metal such as aluminum with excellent thermal conductivity or aluminum alloy may be employed. A heatsink may be placed at a lower surface of the base plate 12 so that the battery module 10 is cooled in an indirect water cooling manner.

In this embodiment, the base plate 12 is made in a thin plate type with a thickness of 1 mm or less to promote thermal conductivity and weight reduction of the module housing 11. However, the thickness of the base plate 12 is not necessarily limited to the thin plate type. Since the base plate 12 is a part that supports the weight of the battery cells, the base plate 12 may be made using a heavy plate or a thick plate with a thickness of 3 mm or more in order to increase its rigidity so that stability of the bottom surface of the module housing 11 is secured.

The cover plate 13 is a part that integrally forms a top surface and both side surfaces of the module housing 11, and may have a cover shape with a cross section of approximately '⊂' shape and be formed using a thin plate with a thickness of 0.1 mm to 1 mm. Hereinafter, in the cover plate 13, a part forming the top surface of the module housing 11 will be defined as a top part 14, and parts forming right and left surfaces of the module housing 11 will be defined as a first side part 15 and a second side part 16, respectively.

The first side part 15 and the second side part 16 of the cover plate 13 are joined to both edge portions of the base plate 12 by welding to provide a rectangular tube-shaped module housing 11. In the module housing 11, for example, pouch-type battery cells may be inserted in a state where their broad surfaces are vertically erected.

The module housing 11 according to the present disclosure is made of a thin plate with a thickness of 1 mm or less as described above and thus has a disadvantage that its mechanical rigidity is weak compared to the existing module housing 11 of the same size. However, the module housing 11 according to the present disclosure is relatively lighter as its thickness is reduced, and also has higher cell volume ratio and lower manufacturing cost since its inner space is expanded.

The insufficient rigidity of the module housing 11 of a thin plate type may be reinforced with a pack tray 20 when the battery module 10 is mounted to the pack tray 20. This will be described later in detail.

The battery module 10 according to this embodiment may further include an impact absorbing body 18 as a cushioning means for both side surfaces of the module housing 11 and a fastening flange 17 as a means for fixing the module housing 11 to the pack tray 20.

The impact absorbing body 18 may be attached to an outer surface of the first side part 15 and an outer surface of the second side part 16, respectively, to buffer an impact applied to the corresponding portions. The impact absorbing body 18 may employ an elastic body such as a memory foam, a rubber pad or a spring, but in this embodiment, a leaf spring 18 with low volume and weight is applied.

Figure 5:
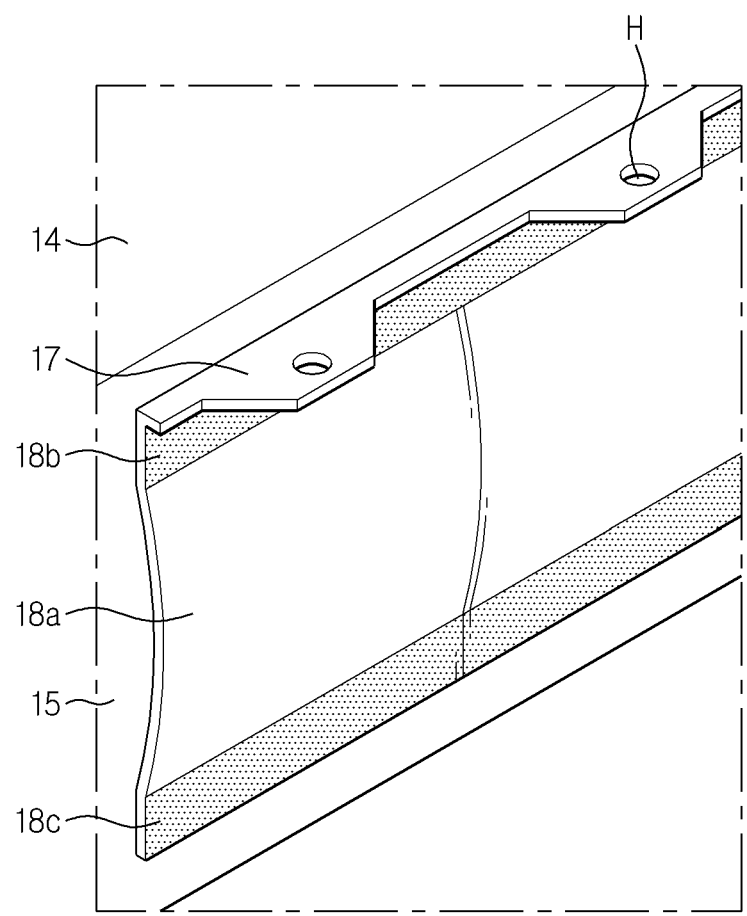
FIG. 5 is a partially enlarged view of FIG. 4.
Figure 6:
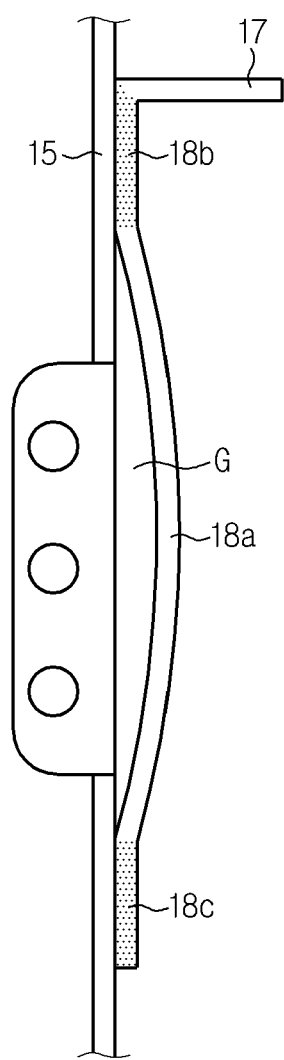
FIG. 6 is a diagram showing an impact absorbing body of FIG. 4, observed in a direction A of FIG. 4.

In the leaf spring 18, as shown in FIGS. 4 to 6, a center portion 18a is convexly curved, and a top portion 18b and a bottom portion 18c of the leaf spring 18 based on the center portion 18a may be attached to the outer surface of the first side part 15 or the outer surface of the second side part 16 by welding. When an external impact, the curved center portion 18a may be concavely deformed such that the leaf spring 18 functions to buffer the impact applied to the module housing 11.

In addition, the leaf spring 18 according to this embodiment is designed to have an area corresponding to the first side part 15 and the second side part 16, a thickness of about 0.5 T, and a gap G of about 1.2 mm between the center portion 18a and a side surface of the module housing 11, so the width increase of the battery module 10 caused by attaching the leaf spring 18 is not large.

The fastening flange 17 may be formed as a single body together with the leaf spring 18. Referring to FIGS. 4 to 6 again, the fastening flange 17 is integrally provided with the leaf spring 18 to be bent in a direction crossing the leaf spring 18 at the top portion of the leaf spring 18, so that the fastening flange 17 extends in a horizontal direction in a region above both side surfaces of the module housing 11. Also, at least one hole H is provided in the plate surface of the fastening flange 17 so that a bolt is inserted therein. In this embodiment, four fastening flanges 17 are provided at regular intervals along a length direction of the leaf spring 18, but the number may be increased or decreased. For reference, the position of the fastening flange 17 may correspond to the height of a rigid beam 21 provided to the pack tray 20 on which the battery module 10 is placed.

For reference, as an alternative to this embodiment, the fastening flange 17 may be integrally formed together with the cover plate 13. However, in this case, as the structure of the fastening flange 17 is added to the cover plate 13, the manufacturing process may become more complicated. Thus, in this embodiment, the structure of the cover plate 13 is simplified into a thin plate form, and the fastening flange 17 and the leaf spring 18 are integrally fabricated and attached to the cover plate 13. In addition, according to this method, a relative position of the fastening flange 17, namely a height thereof, may be easily set by adjusting the size and the attachment position of the leaf spring 18 relative to the side surface of the cover plate 13.

Figure 7:
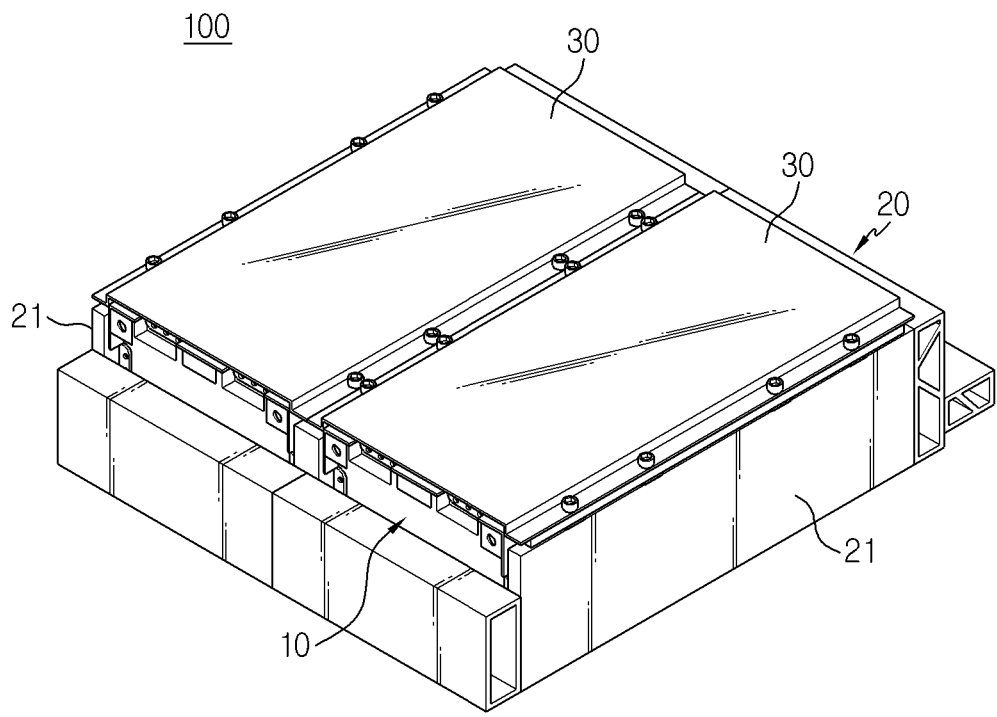
FIG. 7 is a perspective view schematically showing a battery pack according to an embodiment of the present disclosure.
Figure 8:
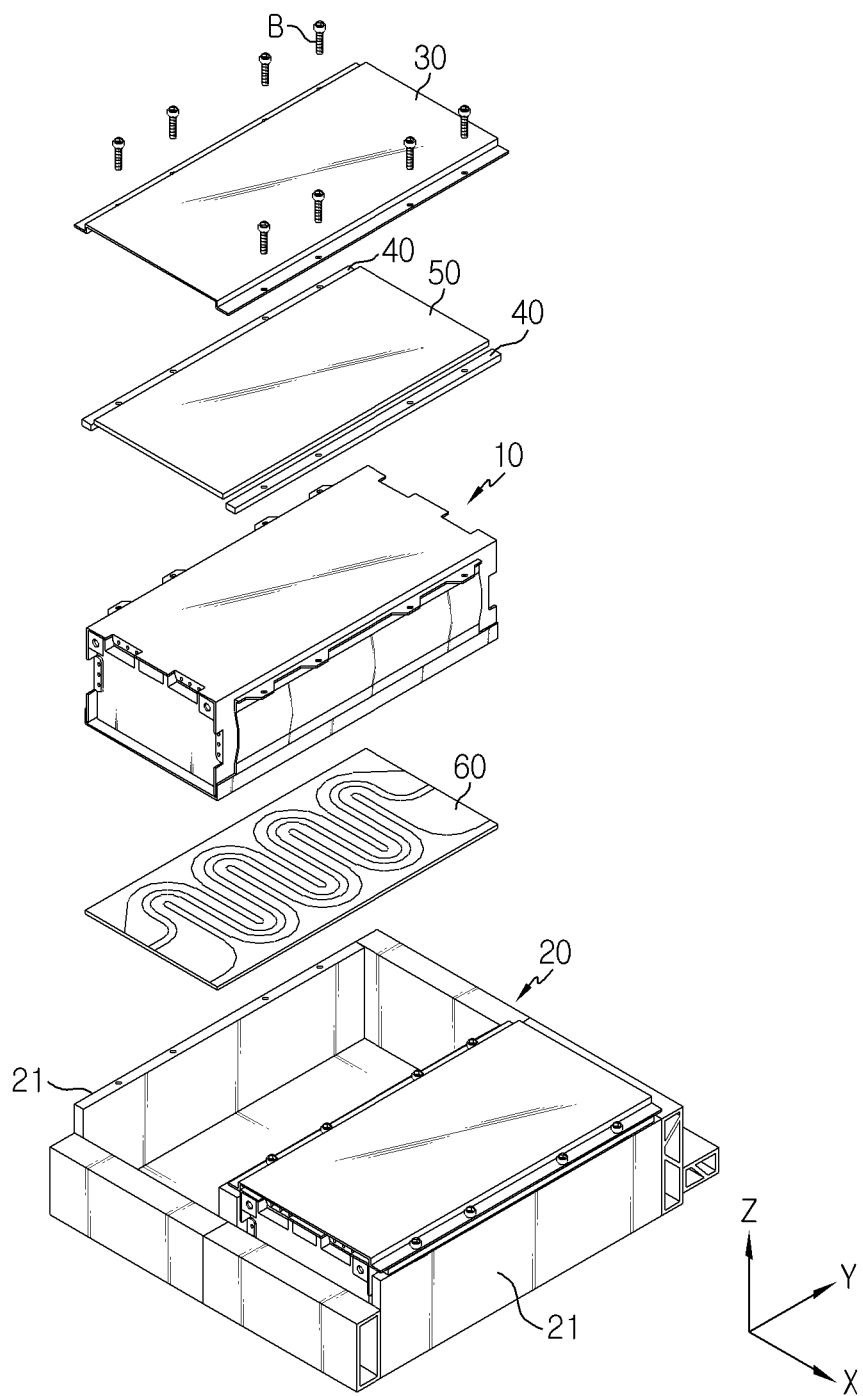
FIG. 8 is a partially enlarged view of the battery pack of FIG. 7.
Figure 9:
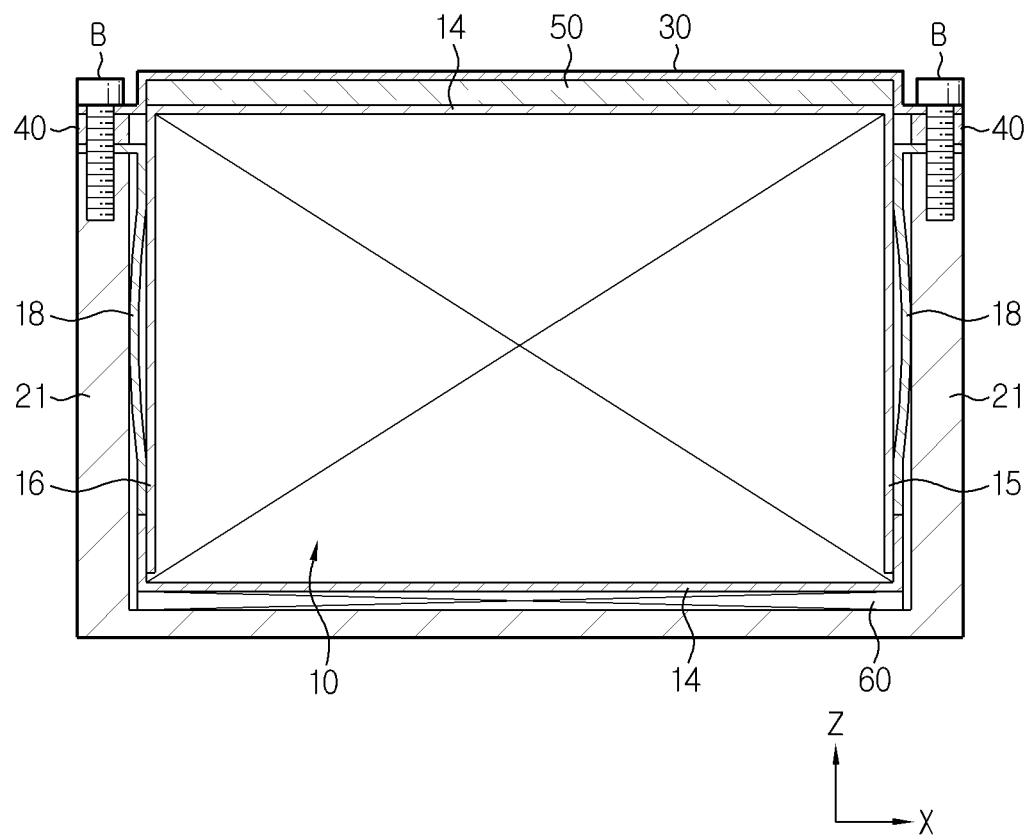
FIG. 9 is a sectional view showing an assembled structure of the battery module and the pack tray according to an embodiment of the present disclosure.

FIG. 7 is a perspective view schematically showing a battery pack according to an embodiment of the present disclosure, FIG. 8 is a partially enlarged view of the battery pack of FIG. 7, and FIG. 9 is a sectional view showing an assembled structure of the battery module 10 and the pack tray 20 according to an embodiment of the present disclosure.

Referring to FIGS. 7 to 9, a battery pack 100 according to the present disclosure may include the at least one battery module 10 described above, a pack tray 20 and a pack cover 30.

The pack tray 20 is a component for providing a space in which the battery module 10 is mounted, and includes a plurality of rigid beams 21 that form walls.

The rigid beams 21 play a role of maintaining the rigidity of the pack tray 20 and a role of supporting both side portions of the battery module 10 to reinforce the insufficient rigidity of the battery module 10.

As shown in FIGS. 7 and 8, the pack tray 20 according to this embodiment is configured such that two battery modules 10 may be mounted thereto. However, the pack tray 20 may also be configured such that mount one battery module 10 or three or more battery modules 10 may be mounted thereto. That is, the size of the pack tray 20 and the number of rigid beams 21 may be changed as necessary according to the number of battery modules 10.

Specifically, the battery modules 10 are placed between two rigid beams 21 of the pack tray 20, respectively, and the fastening flanges 17 may be fixed as being bolted to the top surfaces of the rigid beams 21.

In addition, the upper portion of the battery module 10 may be covered and protected by the pack cover 30. The pack cover 30 may be fixedly coupled to the pack tray 20 as an edge portion thereof is bolted to the top surface of the rigid beam 21 along with fastening flanges 17.

Also, as shown in FIGS. 8 and 9, the battery pack 100 according to this embodiment further includes a spacer 40 interposed between the edge portion of the pack cover 30 and the fastening flanges 17, and a buffer pad 50 interposed between the pack cover 30 and the top surface of the module housing 11.

The spacer 40 is a component for protecting the fastening flanges 17 not to be damaged when bolting and absorbing an assembly tolerance caused by a height difference between the pack cover 30 and the fastening flange 17. The spacer 40 is provided in the form of a rubber band with a predetermined thickness and may be attached in advance along both side edge lines at the bottom surface of the pack cover 30.

For example, the fastening flange 17, which has a thin thickness of 0.5 T, may be easily damaged when bolting, and may not have a weak fixing force since it is not in good contact with the pack cover 30 and the rigid beam 21. However, if the spacer 40 is used, the above problems may be easily solved because the spacer 40 disperses the axial force of the bolt and fixes the fastening flanges 17 with a surface pressure.

The buffer pad 50 is provided in the form of a pad with an area corresponding to the top surface of the module housing 11, and may be attached in advance to a center region of the bottom surface of the pack cover 30. An adhesive tape that may be attached to the top surface of the battery module 10 may be further provided to the bottom surface of the buffer pad 50 so that the position of the pack cover 30 is not displaced when the pack cover 30 is placed on the battery module 10.

The buffer pad 50 is interposed between the pack cover 30 and the top surface of the battery module 10 to protect the battery module 10 from an impact applied from the above and simultaneously restrain the battery module 10 in the up, down, left and right directions.

In a unit battery module 10, eight fastening flanges 17 in total located at both side surfaces of the module housing 11 are bolted to the rigid beam 21, but the fastening flanges 17 made of thin plates may be vulnerable to deformation when an impact is applied thereto. Thus, in this embodiment, the pack cover 30 to which the buffer pad 50 is attached is provided to press the upper surface of the module housing 11, and the buffer pad 50 is adhered to the top surface of the module housing 11, thereby preventing the battery module 10 from moving in up, down, left, right, front and rear directions and thus compensating the fixing force of the fastening flanges 17.

Meanwhile, a heatsink 60 may be further interposed between the top surface of the pack tray 20 and the bottom surfaces of the battery modules 10. The heatsink 60 is a component that absorbs heat from the battery modules 10 by means of heat contact to indirectly cool the battery modules 10 by passing a coolant through an internal flow path.

The coolant flowing in the flow path is not specially limited as long as it is a fluid that flows easily in the flow path and has excellent cooling properties. For example, the coolant may be water that has high latent heat to maximize cooling efficiency. However, without being limited thereto, the coolant may also be an antifreeze, a gas coolant, an air, or the like as long as it causes a flow.

The heatsink 60 may be made of aluminum or aluminum alloy with high thermal conductivity, without being limited thereto. For example, the heatsink 60 may be made of copper, gold or silver. Ceramic materials such as aluminum nitride and silicon carbide other than metal are also possible as the heatsink 60.

As described above, in the battery module 10 according to the present disclosure, the module housing 11 is made of a thin plate with a thickness of 1 mm or less so as to maximize the space for battery cells and minimize the weight of the module housing 11. The weak rigidity of the battery module 10 may be reinforced by being installed to the pack tray 20. Hereinafter, this will be described in detail.

Referring to FIG. 9, the battery module 10 may be protected from an external impact since its upper portion is protected from an external impact due to the pack cover 30 to which the buffer pad 50 is attached and the other portion thereof is confined in the pack tray 20 of a rigid structure.

In particular, the first side part 15 and the second side part 16 of the cover plate 13 corresponding to both side surfaces of the battery module 10 may be primarily protected since the rigid beams 21 of the pack tray 20 serve as protective walls, may be secondarily protected since the leaf springs 18 absorb the impact. In addition, when the battery module 10 is installed to the pack tray, the leaf springs 18 may help the module housing 11 to be tightly inserted and fixed between the rigid beams 21.

Meanwhile, the battery pack according to the present disclosure described above may further include various devices for controlling charging and discharging of the battery modules, such as a BMS, a current sensor and a fuse. The battery pack may be applied not only to vehicles such as electric vehicles or hybrid electric vehicles but also to other IT products.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A battery module comprising:
a plurality of battery cells; and
a module housing forming an inner space for accommodating the plurality of battery cells,
wherein the module housing includes:
a base plate forming a bottom surface of the module housing;
a cover plate integrally forming a top surface and opposite side surfaces of the module housing; and
a fastening flange configured to extend in a horizontal direction in a region above the opposite side surfaces of the module housing,
wherein the cover plate includes a top part forming the top surface of the module housing, and a first side part and a second side part forming the opposite side surfaces of the module housing,
wherein an impact absorbing body is further attached to an outer surface of at least one of the first side part and the second side part,
wherein a gap is interposed between the impact absorbing body and the outer surface of the at least one of the first side part and the second side part,
wherein a size of the gap is less than a length of the fastening part in the horizontal direction,
wherein the impact absorbing body is a leaf spring having a center portion curved convexly to define the gap, and a top portion and a bottom portion of the leaf spring based on the center portion, and
wherein the top portion and the bottom portion are parallel and coplanar to each other based on the outer surface of at least one of the first side part and the second side part.

2. The battery module according to claim 1,
wherein the cover plate is formed as a thin plate with a thickness of about 0.1 mm to about 1 mm.

3. The battery module according to claim 1,
wherein the leaf spring is respectively attached to the outer surface of the first side part, the outer surface of the second side part, or both, and
wherein the top portion and the bottom portion of a respective leaf spring are welded to the outer surface of the first side part, the outer surface of the second side part, or both.

4. The battery module according to claim 3,
wherein the leaf spring is formed as a body integrated with the fastening flange, and
the fastening flange is provided to be bent in a direction crossing the leaf spring at the top portion of the leaf spring and has at least one hole.

5. A battery pack, comprising:
at least one battery module according to claim 1; and
a pack tray configured to provide a space in which the at least one battery module is mounted,
wherein the pack tray includes a plurality of rigid beams configured to support opposite side portions of the at least one battery module.

6. The battery pack according to claim 5,
wherein the at least one battery module is placed between two of the plurality of rigid beams, and the fastening flange is coupled to a top surface of a rigid beam of the two rigid beams.

7. The battery pack according to claim 6, further comprising:
a pack cover coupled to the pack tray and configured to cover an upper portion of the at least one battery module.

8. The battery pack according to claim 7,
wherein the pack cover, the fastening flange and the rigid beam are integrally fastened to each other by a fastening member.

9. The battery pack according to claim 7, further comprising:
a spacer attached to a bottom surface of the pack cover and configured to surface-press the fastening flange.

10. The battery pack according to claim 7, further comprising:
a buffer pad attached to a bottom surface of the pack cover and adhered to the top surface of the module housing.

11. The battery pack according to claim 5, further comprising:
a heatsink disposed at a bottom surface of the at least one battery module.

12. The battery pack according to claim 5, wherein the battery module includes an impact absorbing body attached to an outer surface of a side part of the cover plate.

13. The battery pack according to claim 12,
wherein the impact absorbing body is a leaf spring, and
wherein the leaf spring has a center portion curved convexly, and a top portion and a bottom portion of the leaf spring based on the center portion are welded to the outer surface of the side part.

14. The battery pack according to claim 13,
wherein the leaf spring is interposed between the cover plate and at least one of the plurality of rigid beams.

15. The battery pack according to claim 12,
wherein the impact absorbing body is interposed between the cover plate and at least one of the plurality of rigid beams.

16. A battery module comprising:
a plurality of battery cells; and
a module housing forming an inner space for accommodating the plurality of battery cells;
an impact absorbing body attached to an outer surface of a side part of the module housing,
wherein the impact absorbing body is a leaf spring,
wherein the leaf spring has a center portion curved convexly, and a top portion and a bottom portion of the leaf spring based on the center portion are welded to an outer surface of the side part of the module housing, and
wherein the top portion and the bottom portion are parallel and coplanar to each other based on the outer surface of the second side part of the module housing.

17. The battery module according to claim 16,
wherein the module housing includes:
a base plate forming a bottom surface of the module housing;
a cover plate integrally forming a top surface and opposite side surfaces of the module housing; and
a fastening flange configured to extend in a horizontal direction in a region above the opposite side surfaces of the module housing.

18. The battery module according to claim 17, wherein the center portion of the leaf spring defines a gap between the leaf spring and the outer surface of the side part of the module housing, and
wherein a size of the gap is less than a length of the fastening flange in the horizontal direction.

19. The battery module according to claim 18, wherein the size of the gap is about 1.2 mm.

20. The battery module according to claim 1, wherein the size of the gap is about 1.2 mm.

21. The battery module according to claim 1, wherein the size of the gap continuously decreases from the center portion to the top portion, and from the center portion to the bottom portion.

* * * * *